United States Patent [19]
Tashjian et al.

[11] Patent Number: 5,168,141
[45] Date of Patent: Dec. 1, 1992

[54] VISION GUIDED LASER WELDING

[75] Inventors: David G. Tashjian; Shawn K. Murphy, both of Wilmington, N.C.

[73] Assignee: General Electric Company, San Jose, Calif.

[21] Appl. No.: 715,201

[22] Filed: Jun. 14, 1991

[51] Int. Cl.$^5$ .......................................... B23K 26/00
[52] U.S. Cl. ........................ 219/121.63; 219/121.64; 219/121.78; 219/121.82; 219/121.83
[58] Field of Search ................ 219/121.63, 121.64, 219/121.78, 121.82, 121.83

[56] References Cited

U.S. PATENT DOCUMENTS

| | | | |
|---|---|---|---|
| 4,918,284 | 4/1990 | Weisz | 219/121.78 |
| 4,998,005 | 3/1991 | Rathi et al. | 219/121.83 |
| 5,017,755 | 5/1991 | Yahagi et al. | 219/121.68 |

Primary Examiner—C. L. Albritton
Attorney, Agent, or Firm—Robert R. Schroeder

[57] ABSTRACT

To produce precision laser weld joints at weld sites on a workpiece, a TV camera views each weld site through the laser beam optics, and the video output is stored as pixel data in a frame grabber memory. A computer processes the pixel data in accordance with an algorithm to locate the position of the optimum weld point for the imaged weld site relative to the laser beam centerline in the camera field of view and then indexes a X-Y positioning table to fine position the workpiece with the located optimum weld point precisely aligned with the laser beam centerline.

19 Claims, 2 Drawing Sheets

VISION GUIDED LASER WELDING

The present invention relates to laser welding, and particularly to a method and apparatus for accurately positioning a laser welding beam precisely at a succession of weld sites to join a plurality of parts in a complex assembly.

BACKGROUND OF THE INVENTION

There are numerous manufacturing operations calling for the welding of a multiplicity of parts together to form a complex assembly of exacting dimensional tolerances and physical integrity. One such assembly is a nuclear fuel bundle spacer of the construction disclosed in commonly assigned Matzner et al. U.S. Pat. No. 4,508,679. These spacers are comprised of a plurality of tubular cells or ferrules, each approximately 1.2 inches long and 0.64 inches in diameter, with a wall thickness of approximately 0.025 inches. The ferrules are arranged in a matrix array with contiguous peripheral points of adjacent ferrules conjoined by butt welds. The bore of each ferrule provides a passage for receipt of an elongated fuel rod of the bundle. The fuel rods are centered and laterally supported in the ferrule bores between resilient springs and opposed stops integrally formed near the upper and lower ferrule edges. If the laser beam is not precisely centered on the weld sites constituted by the points of virtual peripheral abutment between the upper and lower edges of the ferrule, an unacceptable butt weld is achieved due to insufficient weld penetration. Also, an off-center laser beam can impinge on the fuel rod centering springs located beneath the ferrule edges, inflicting damage thereon. In either case, the resulting spacer is unacceptable and must be scrapped.

SUMMARY OF THE INVENTION

It is accordingly a principle objective of the present invention to provide a method and apparatus for rapidly centering a laser welding beam on a succession of weld sites to achieve high quality welds joining multiple parts in assembly on a expedited, automated basis. To this end, the apparatus includes a laser welder having a head for focussing a highly concentrated laser welding beam on a workpiece resting on an X-Y positioning table and having a plurality of sites to be welded. A CNC controller activates the positioning table in accordance with a predetermined nominal weld site position map to successively locate each weld site at a nominal weld position relative to the laser beam. A source of back illumination casts a sharp image of each weld site in its nominal weld position, which is viewed by a camera through the laser beam optics. The weld site image is stored in a frame grabber as pixel image data for processing by a computer in accordance with an optimal weld point location algorithm. Pursuant to this algorithm, the computer locates certain geometrical features of the workpiece immediately adjacent the weld site and, based on these located features, defines the position of the optimum weld point for the weld site in relation to the position of the laser beam centerline. The computer then fine positions the positioning table accordingly, via the CNC controller, to bring the optimum weld point into precise alignment with the centerline of the laser beam.

To calibrate the apparatus, a solid sheet metal coupon is placed on the positioning table in the same focal plane occupied by the weld sites. A hole is then burned in the coupon by the laser beam. The position of the burn hole centroid in the camera field of view is then located by the computer. The computer then instructs the CNC controller to reposition the coupon along one axis and then the other axis of the positioning table by a predetermined distance. The lengths of burn hole movement in the camera field of view along the X and Y axes (measured in pixels) are respectively ratioed with the predetermined distance of positioning table movement along the X and Y axes to derive X and Y calibration constants which are factored with the fine positioning X and Y inputs to the controller in indexing the weld site optimal weld point into precise alignment with the laser beam centerline.

The invention accordingly comprises the features of construction, combination of elements, arrangement of parts, and a combination of method steps, all as detailed hereinafter, and the scope of the invention will be indicated in the claims.

BRIEF DESCRIPTION OF THE DRAWINGS

For a full understanding of the nature and objects of the present invention, reference may be had to the following Detailed Description taken in conjunction with the accompanying drawings, in which.

DETAILED DESCRIPTION

Figure 1:
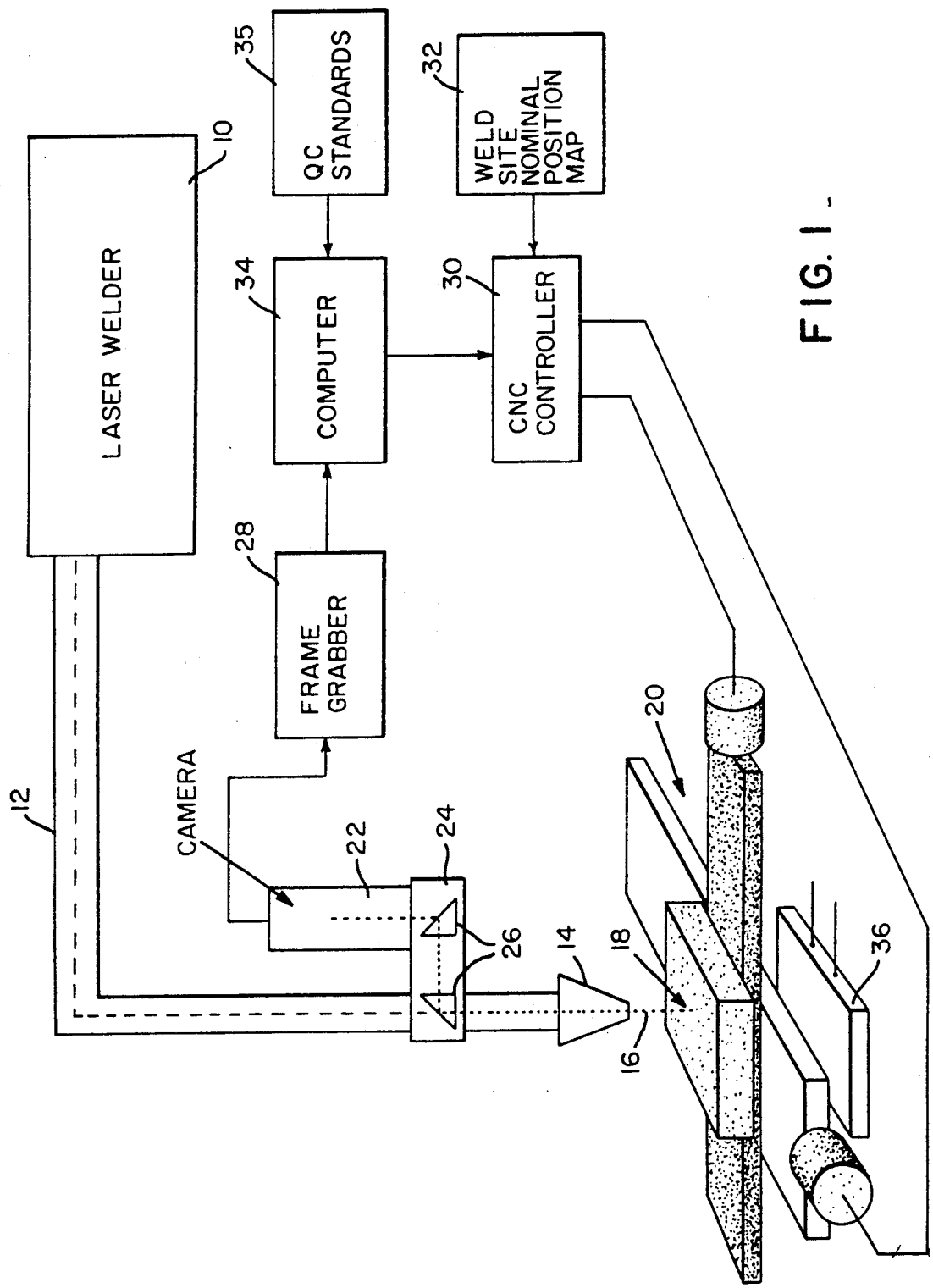
FIG. 1 is a block diagram of vision guided laser welding apparatus constructed in accordance with the present invention.

The vision guided laser welding apparatus of the present invention includes, as seen in FIG. 1, a laser welder 10, such as a Coherent General Model S-51 $CO_2$ laser, having a beam delivery tube 12 through which laser energy is directed to a focussing head 14 from which is emitted a concentrated, vertically oriented welding beam 16 for impingement on an underlying workpiece 18 fixtured on an X-Y positioning table, generally indicated at 20. A TV camera 22, such as a charge coupled device (CCD) camera, is affixed on the focussing head mounting bracket 24 to view the workpiece over the optical path of the laser beam and a pair of right angle reflecting prisms 26. The video signal output of the camera is digitized and stored by a conventional frame grabber 28 as pixel data representing the two-dimensional image of one of the many workpiece weld sites situated within the camera field of view (FOV) by the positioning table 20 in response to X-Y positioning inputs from a CNC controller 30 acting in response to coarse X-Y positioning instructions from a weld site nominal position map 32. As described below, a computer 34 processes the pixel data stored in the frame grabber to define the location of the optimum weld point on the weld site relative to the laser beam centerline and to generate fine X-Y positioning data inputs for bringing the optimum weld point into precise alignment with the centerline of laser welding beam 16.

For purposes of the following description, workpiece 18 is assumed to be a nuclear fuel bundle spacer of the construction disclosed in the above cited Matzner et al. U.S. patent. Thus, the workpiece is in the form of an assembly of ferrules fixtured in a tight matrix array. The objective of the present invention is to visually locate, as weld sites, the most contiguous tangent points on the outer edges of each adjacent pair of ferrules, define the optimum weld point for each weld site, and then guide each optimum weld point into precise alignment with the centerline of the laser welding beam preparation to butt welding the ferrules in conjoined assembly. To provide a sharp image of each weld site for viewing by camera 22, the spacer is back illuminated by a light panel 36, preferably of solid state fiber optic construction. Since the camera viewing angle is normal to the plane containing the multiple weld sites, this back illumination casts a precise image of each weld site at the appropriate focal point of the laser beam 16 established by focussing head 14. The substantial image contrast permits very accurate location of the upper edges of the ferrules at each weld site by computer 34 pursuant to defining the precise location of the optimum weld point therefor.

To ensure requisite accuracy, the position of the laser beam centerline must be referenced in the camera FOV, and the relationship between the dimensional units of the image data stored in the frame grabber memory and the dimensional units of the positioning table must be calibrated. Thus, in accordance with an important aspect of the present invention, a solid metal sheet or coupon (not shown) of approximately ten mils thickness is placed on the positioning occupy. The laser welder 10 then burns a small hole in the coupon, and the image of this hole in the camera FOV including the burn hole is stored in the frame grabber memory.

Computer 34 processes the stored pixel data to define the precise location of the hole centeroid in terms of pixel coordinate location $(X_1, Y_1)$, which then locates the laser beam centerline in the camera FOV. The computer then instructs CNC controller 30 to move the coupon a predetermined number (N) of mils along the X axis, and the new X axis position coordinate $X_2$ of the hole centroid is located. An X axis calibration constant KX is then calculated by the computer as $$KX = \frac{X_1 - X_2}{N} \text{ pixels/mil}$$

The computer then instructs the CNC controller to move the coupon N mils along the Y axis, and the new Y axis position coordinate $Y_2$ of the hole centroid is located. The Y axis calibration constant KY is then calculated as $$KY = \frac{Y_1 - Y_2}{N} \text{ pixels/mil}$$

As a result of this calibration algorithm, the location of the laser beam centerline in the camera FOV is defined, and the X-Y coordinate system of the positioning table is calibrated to the X-Y coordinate system of the stored FOV image. The apparatus is then also calibrated for the magnification of the camera optics and the aspect ratio of the FOV. Since the laser beam tends to drift over time, this calibration procedure may have to be repeated at frequent intervals to redefine its centerline position in the camera FOV.

Figure 2:
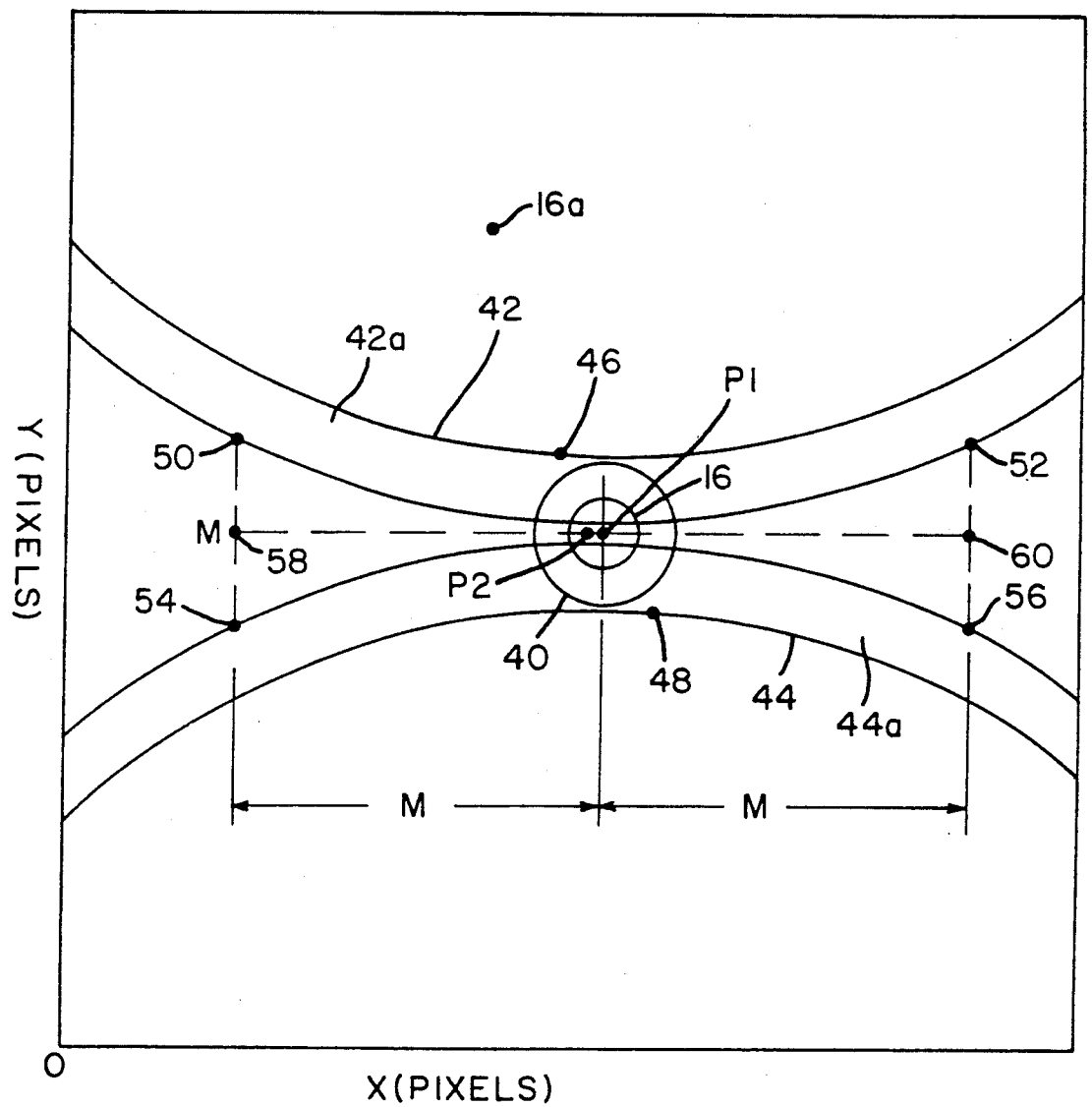
FIG. 2 is a plan view of a weld site imaged by the apparatus of FIG. 1 to illustrate a preferred algorithm for defining the position of the weld site optimal weld point.

To describe the operation of the apparatus in locating the optimum weld point for a weld site, reference is made to FIG. 2 which illustrates a FOV pixel image including a weld site 40 coarsely positioned into the camera FOV by the CNC controller in response to X-Y positioning inputs from weld site nominal position map 32 of FIG. 1. The size of the camera FOV may be in the order of 200 mils square, which, in the case of a nuclear fuel bundle spacer, is sufficient to cover only one weld site. As seen in FIG. 2, weld site 40 includes the region where the peripheral surfaces of adjacent ferrules 42 and 44 are abutting or in essentially abutting relation at their upper ends 42a and 44a, respectively, i.e., the region including the most contiguous tangent points on the outer edges of the two adjacent ferrules. Ideally, these contiguous tangent points are abutting, however satisfactory butt weld joints can be achieved even if they are in a gapped relation, as long as the gap is not excessive. Thus, the computer checks the dimension of any gap and, if it exceeds a predetermined limit, e.g. 2-3 mils, halts operation. The spacer is removed from inspection to see if the excessive gap can be cured by refixturing.

In accordance with the optimum weld point location algorithm of the present invention, the computer processes the stored pixel data to locate the lowest point 46 on the inner edge of upper ferrule 42 and the uppermost point 48 on the inner edge of the lower ferrule 44. The midpoints between the X axis pixel coordinates and the Y axis pixel coordinates of points 46 and 48 are calculated to define a location P1. This location is declared as a potential optimal laser weld point.

To confirm this point P1 as the true optimal weld point, the computer inspects the pixel image data along X coordinates a fixed distance M both to the left and to the right of point P1 to locate points 50 and 52 on the peripheral edge of ferrule 42 and points 54 and 56 on the peripheral edge of ferrule 44. The midpoint 58 between the Y coordinates of points 50 and 54 and the midpoint 60 between the Y coordinates of points 52 and 56 are located. A line connecting these midpoints 58 and 60 is bisected to locate a point P2. If points P1 and P2 are coincided within a pre-established manufacturing tolerance, e.g., lie within weld site 40, point P1 is declared as the optimum welding point. The optimum weld position in X-Y pixel coordinates is then correlated with the pixel coordinates of the actual position of the laser beam centerline, indicated for example at 16a in FIG. 2, to derive offset or fine X-Y positioning data defining the offset between the beam and optimum weld point locations. This positioning data is factored with the calibration constants KX and KY and fed to the CNC controller, which, in response, fine positions the table to bring the optimum weld position into precise alignment with the centerline of the laser beam, indicated at 16 in FIG. 2. The laser welder then generates the laser welding beam to butt weld the ferrules together. After the completion of a weld, an image of the weld joint may be stored in the frame grabber memory, enabling the computer to inspect the weld joint and determine that it satisfies quality control (QC) standards 35 (FIG. 1).

It will be appreciated that the weld sites may be coarsely positioned with the adjacent ferrule pair in a different relationship in the camera FOV from that illustrated in FIG. 2, e.g., arranged in side-by-side relation along the X axis rather than along the Y axis, the optimum weld point location algorithm locates point P1 by finding the leftmost point on the inner edge of the left ferrule. The midpoints between the X coordinates and Y coordinate of these extreme points are calculated to define the position of point P1 in the FOV. The point P2 position is then defined by inspecting the area between the ferrules along the Y axis to locate the requisite outer or peripheral edge points corresponding to points 50, 52, 54 and 56 in FIG. 2. It will be appreciated that the characteristics of the optimum weld point location algorithm provided by the present invention compensate for any minor geometrical irregularities in the ferrules themselves and in the ferrule relative positions pursuant to locating the unique optimum weld point for each weld site.

Upon the completion of each weld joint and the optional QC inspection thereof, the next weld site in sequence is indexed into the camera FOV by the CNC controller in response to coarse positioning data inputs from weld site nominal position map 32 and then vision guided into precise, alignment with the laser beam for welding. If at anytime the optimum weld position can not be found or confirmed, welding is halted, and the spacer is removed from the positioning table for inspection. If the problem resides in correctable errors in fixturing or assembly, the spacer can be saved. Otherwise the spacer is scrapped or salvaged to the extent possible.

It is seen from the foregoing that the present invention provides apparatus for performing a plurality of laser welds at a multiplicity of weld sites on an automated, production line bases. The ability to optically guide the each weld site into a precise, optimum weld position with respect to the laser beam ensures weld joints of consistent premium quality. Throughput of acceptable welded assemblies is thus significantly enhanced. Accordingly, the objectives of the present invention set forth above, including those made apparent in the Detailed Description, are efficiently attained, and, since certain changes may be made in the disclosed embodiment without departing from the scope of the invention, it is intended that matters of detail be taken as illustrative and not in a limiting sense.

Having described the invention, what is claimed as new and desired to secure by Letters Patent is:

1. A method for affecting a precision weld joint at a weld site on a workpiece comprising the steps of:
  A. placing the workpiece on an X-Y positioning table;
  B. providing a laser beam focussing head in welding relation to the workpiece;
  C. positioning a camera in imaging relation to the workpiece and in fixed relation with the focussing head such that the centerline of the laser beam emitted by the focussing head is positioned within the field of view of the camera;
  D. indexing the workpiece to normally position a weld site within the camera field of view;
  E. storing an image of the camera field of view in pixel data format;
  F. inspecting the pixel data to identify positions in the field of view image of workpiece structural features adjacent the weld site;
  G. locating, from the structural feature positions, the position of an optimum weld point on the weld site relative to the position of the laser beam centerline in the camera field of view;
  H. correcting the workpiece position to bring the weld site optimum weld point into alignment with the centerline of the laser beam; and
  I. generating the laser beam to effect the weld joint.

2. The method defined in claim 1, which further includes successively repeating steps D through I to effect a weld joint at each of a plurality of weld sites on the workpiece.

3. The method defined in claim 1, wherein the camera views the weld site through the laser beam optics of the focussing head.

4. The method defined in claim 3, wherein said locating step includes the steps of
  1) calculating from a first plurality of identified structural feature positions a first position for the optimum weld point,
  2) calculating from a second plurality of identified structural feature positions relative to said first optimum weld point position a second position for the optimum weld point, and
  3) accepting the first optimum weld point position as the true optimum weld point position when the second optimum weld point position is substantially coincident therewith.

5. The method defined in claim 3, which further includes the step of back illuminating the workpiece to cast a high contrast image of the weld site for viewing by the camera.

6. The method defined in claim 3, which further includes a calibration procedure comprising the steps of
  1) placing a coupon of solid sheet material on the positioning table,
  2) burning a hole in the coupon using the laser beam,
  3) storing a first image of the camera field of view including the burn hole,
  4) inspecting the stored image to define the position of the centroid of the burn hole and centerline in the camera field of view,
  5) indexing the coupon a predetermined distance along the X axis of the positioning table,
  6) storing a second image of the coupon including the burn hole,
  7) inspecting the second image to define the position in the camera field of view of the burn hole centeroid,
  8) indexing the coupon a predetermined distance along the Y axis of the positioning table,
  9) storing a third image of the coupon including the burn hole,
  10) inspecting the third image to define the position in the camera field of view of the burn hold centroid, and
  11) ratioing the length of X and Y burn hole centroid movements in pixel dimensional units of the camera field of view stored image with the lengths of X and Y burn hole centroid movements in positioning table dimensional units to derive respective X and Y axes calibration constants.

7. The method defined in claim 3, wherein the workpiece is a nuclear fuel bundle spacer including a matrix array of ferrules and a plurality weld sites, each including the most poximate tangent points on an adjacent pair of ferrules at the ends thereof facing the focussing head and camera.

8. The method defined in claim 7, wherein the spacer structural features are points on the inner and outer edges of each adjacent pair of ferrules.

9. The method defined in claim 8, wherein said locating step includes the steps of
  1) identifying the respective positions of first and second extreme points on the inner edges of the adjacent ferrules nearest the proximate tangent points, and,
  2) calculating the respective midpoints between the X and Y pixel coordinates of the first and second points to define the position of the optimum weld point.

10. The method defined in claim 9, wherein said locating step further includes the step of confirming that the calculated optimum weld point position defined by calculating step 2) is the true optimum weld point position by
   1) identifying the positions of third and fourth points on the outer edge of one ferrule that are equidistant (M) from the calculated optimum weld point position to each side of the weld site,
   2) identifying the positions of fifth and sixth points on the outer edge of the other ferrule that are equidistant (M) from the calculated optimum weld point position to each side of the weld site,
   3) calculating the midpoint of a first line connecting the third and fifth points and the midpoint of a second line connecting the fourth and sixth points,
   4) calculating the midpoint of a third line connecting the first and second line midpoints to define a confirming optimum weld point position, and
   5) accepting the calculated optimum weld point position as the true optimum weld point position when the confirming optimum weld point position is substantially coincident therewith.

11. The method defined in claim 10, which further includes the step of back illuminating the spacer to cast a high contrast image of the weld site for viewing by the camera.

12. The method defined in claim 5, which further includes the steps of
   1) storing an image of the weld joint, and
   2) inspecting the stored image pixel data to determine if the weld joint meets quality assurance standards.

13. Apparatus for affecting a precision weld joint at a weld site on a workpiece, said apparatus including, in combination:
   A. an X-Y positioning table for supporting the workpiece;
   B. a laser welder including a focussing head for directing a laser beam at the workpiece;
   C. a camera mounted in fixed relation, to said focussing head with the centerline of the laser beam within the field of view of said camera;
   D. a X-Y positioning table controller;
   E. means providing coarse positioning inputs to said controller for indexing said table to nominally position a weld site within the field of view of said camera;
   F. means responsive to the video output of said camera for storing an image of the weld site in pixel data format; and
   G. a computer for processing the stored pixel data to
      1) identify the positions in said camera field of view of workpiece structural features adjacent the weld site,
      2) calculate, from the identified structural feature positions, the position of an optimum weld point on the weld site relative to the position of the centerline of the laser beam, and
      3) provide fine positioning inputs to said controller for indexing said table to position the optimum weld point in alignment with the laser beam centerline preparatory to affecting a weld joint by the laser beam.

14. The apparatus defined in claim 13, wherein said camera is positioned to view the weld site through laser bean optics of said focussing head.

15. The apparatus defined in claim 14, which further includes an optimum weld point location algorithm for controlling the processing of pixel data by said computer to
   1) calculate from a first plurality of identified structural feature positions a first position of an optimum weld point,
   2) calculate from a second plurality of identified structural feature positions relative to said first optimum weld point position a second position of an optimum weld point, and,
   3) accepting said first optimum weld point position as a true optimum weld point position when said first and second optimum weld point positions are substantially coincident.

16. The apparatus defined in claim 15, which further includes a light source for back illuminating the workpiece to cast a high contrast image of the weld site for viewing by said camera.

17. The apparatus defined in claim 16, wherein the workpiece is a nuclear fuel bundle spacer including a matrix array of ferrules and a plurality weld sites, each including the most poximate tangent points on an adjacent pair of ferrules at the ends thereof facing said focussing head and camera.

18. The apparatus defined in claim 17, wherein the spacer structural features are points on the inner and outer edges of each adjacent pair of ferrules.

19. The apparatus defined in claim 18, which further includes a calibration algorithm for operating said computer to locate the position of the centerline of said laser beam in the field of view of said camera and to calibrate the pixel dimension units of the stored field of view X-Y coordinate system to the dimension units of the X-Y coordinate system of said table.

* * * * *